Feb. 12, 1963

C. O. LASSY 3,077,346

FIXTURE FOR HOLDING A PLURALITY OF WORKPIECES

Filed March 11, 1958

Carl O. Lassy
INVENTOR.

BY *Clarence A. O'Brien*
*and Harvey B. Jacobson*
Attorneys

Feb. 12, 1963 C. O. LASSY 3,077,346
FIXTURE FOR HOLDING A PLURALITY OF WORKPIECES
Filed March 11, 1958 3 Sheets-Sheet 2
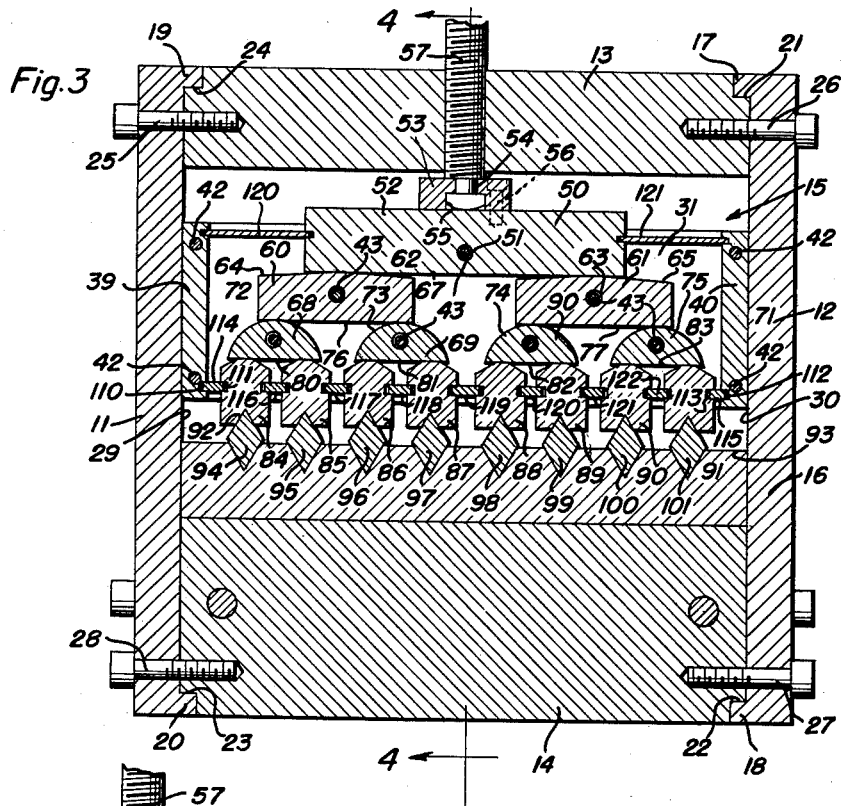
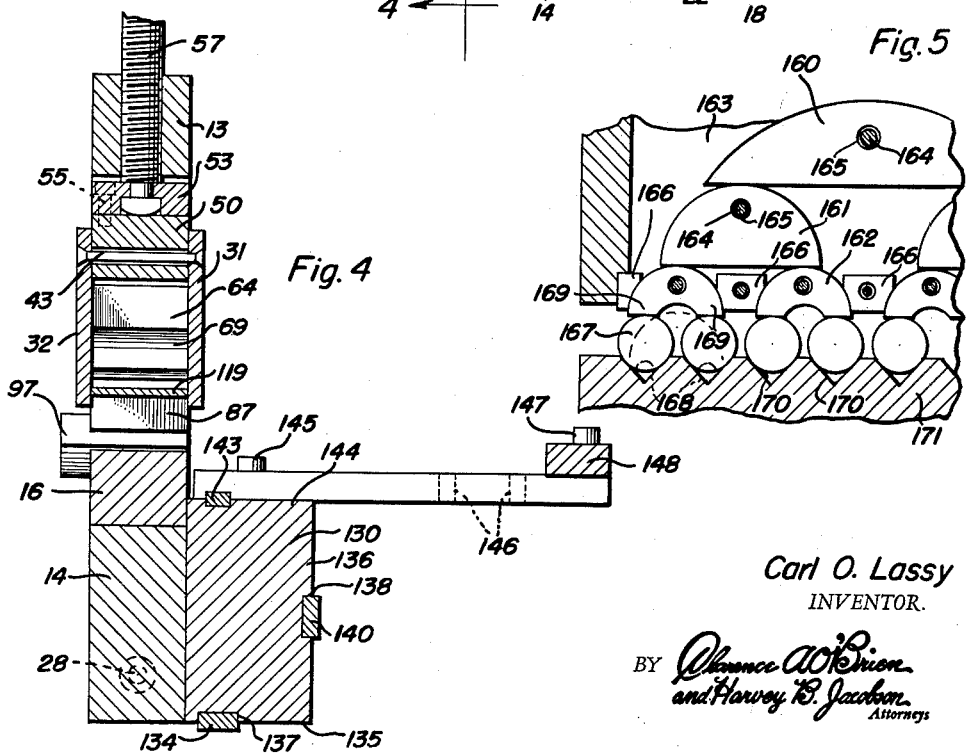
Carl O. Lassy
INVENTOR.

Feb. 12, 1963 C. O. LASSY 3,077,346
FIXTURE FOR HOLDING A PLURALITY OF WORKPIECES
Filed March 11, 1958 3 Sheets-Sheet 3

Carl O. Lassy
INVENTOR.

BY *Clarence A. O'Brien*
*and Harvey B. Jackson*
Attorneys

United States Patent Office 3,077,346
Patented Feb. 12, 1963

3,077,346
FIXTURE FOR HOLDING A PLURALITY
OF WORKPIECES
Carl O. Lassy, 96 Bohemia St., Plainville, Conn.
Filed Mar. 11, 1958, Ser. No. 720,597
4 Claims. (Cl. 269—251)

This invention relates in general to work holding devices and pertains more particularly to a device of this nature particularly adapted for holding a large number of workpieces precisely and accurately and in true alignment so that various milling, grinding, or shaping operations may be performed on the several workpieces so that each is an exact duplicate of the others.

In machining operations, it is frequently desirable to perform milling, grinding or shaping operations on a large number of workpieces and to do so in such a manner that, with reference to a surface or point on the several workpieces, the milling, grinding or shaping operations are identically performed on the individual workpieces so that with reference to such common points or planes, the workpieces are duplicates of each other. Naturally, in such machining operations, it is of absolute necessity that the individual workpieces all be tightly and accurately held in place and whereas this may be accomplished by rather simple means, as for example between a fixed and movable jaw, if all of the workpieces are of identical dimensions, from a practical standpoint, particularly where the workpieces are being formed from rough stock, the becomes an impossibility. That is to say, if the several workpieces upon which the machining operations are desired to be performed vary slightly in width or thickness, some means must be provided for firmly anchoring and clamping upon each and every one of the individual work pieces. It is therefore of primary concern in connection with this invention to provide a fixture particularly adapted to clamp or hold a large number of workpieces in alignment with each other so that identical machining operations may be performed on all of the workpieces and wherein the clamping or holding action is substantially uniform and identical with respect to each and every one of the separate workpieces.

Another object of this invention is to provide a work holding fixture of the character above set forth which may be constructed as economically as possible and yet which will, at the same time, operate efficiently and effectively in accurately and positively holding each and every one of the separate workpieces positioned therein.

A further object of this invention is to provide a workpiece holding fixture adapted to hold and contain a plurality of workpieces incorporating an arrangement of parts which greatly simplifiers the construction thereof, readily permits of replacement or changing of the compensating jaw assembly thereof and at the same time permits the device to be made as economically as possible.

Still another object of this invention is to provide a work holding fixture for accommodating a large number of workpieces wherein the construction thereof embodies an arrangement of parts such that the clogging or loading up of the assembly with chips generated in machining operations is substantially completely eliminated.

A further object of this invention is to provide a work holding fixture for accommodating a large number of separate and individual workpieces incorporating an essentially open framework including a fixed jaw member and slidably carrying a compensating jaw assembly movable toward and away from the fixed jaw member and wherein the elements individually making up the compensating jaw assembly for producing the actual clamping action upon the work are so related, one to the other, and with the carriage assembly carrying these elements as to sustain the entire clamping forces without imparting any such force to the carriage assembly.

Still another object of the invention resides in the provision, in a multiple workpiece holding fixture, of a pair of side rails forming part of the frame for the device and, in conjunction therewith, a pair of retainer plates having opposite end portions thereof slidably sandwiching the side rails therebetween so that the retainer plates are free at all times to move back and forth along the side rails, the retainer plates carrying a plurality of rivet or similar elements therebetween and which rivet elements serve to hold in place, between the retaining plates, a plurality of interengaged compensating jaw elements but wherein the rivet elements themselves do not receive, transmit or absorb any clamping forces exerted upon the compensating jaw elements themselves.

A further object of this invention is to provide a work holding fixture adapted to accommodate a large number of workpieces in which the compensating jaw assembly thereof, comprising a plurality of interengaged and cooperable separate jaw elements, is so constructed as to permit the compensating jaw elements to be economically made.

Still another object of this invention is to provide a compensating jaw assembly for use in a work holding fixture including a pair of spaced, parallel retaining plates rigidly joined together and forming a carriage with there being a plurality of rivets or pin-like elements extending between the retaining plates and passing through enlarged openings in a plurality of separate and independent but interengaged compensating jaw elements, the enlarged openings in the compensating jaw elements permitting shifting thereof in any direction within a plane parallel to the retaining plates so as to acommodate for variations in size of workpieces engaged by the compensating jaw assembly.

Still another object of this invention is to provide improvements in work holding fixtures which accommodate a large number of individual and separate workpieces wherein the construction thereof is such that the assembly is substantially open to permit the accommodation of workpieces of substantially any length.

Still another object of this invention is to provide a device in accordance with the preceding objects wherein there is provision for supporting intermediate portions of workpieces remote from the portions thereof engaged by the jaw assemblies of the fixture.

These together with other objects and advantages which will become subsequent apparent reside in the details of construction and operation as more fully hereinafter described and claimed, reference being had to the accompanying drawings forming a part hereof, wherein like numerals refer to like parts throughout, and in which:

FIGURE 3 is a vertical section taken substantially along the plane of section line 3—3 in FIGURE 2 and illustrating the cooperative relationship of parts of the entire assemblage and illustrating the jaw assemblies in operative association holding a plurality of workpieces therebetween;

FIGURE 4 is a sectional view taken substantially along the plane of section line 4—4 in FIGURE 3 showing further details of construction of the fixture;

FIGURE 5 is a sectional view of a portion of the jaw assemblies of a modified compensating jaw assemblage;

Figure 1:
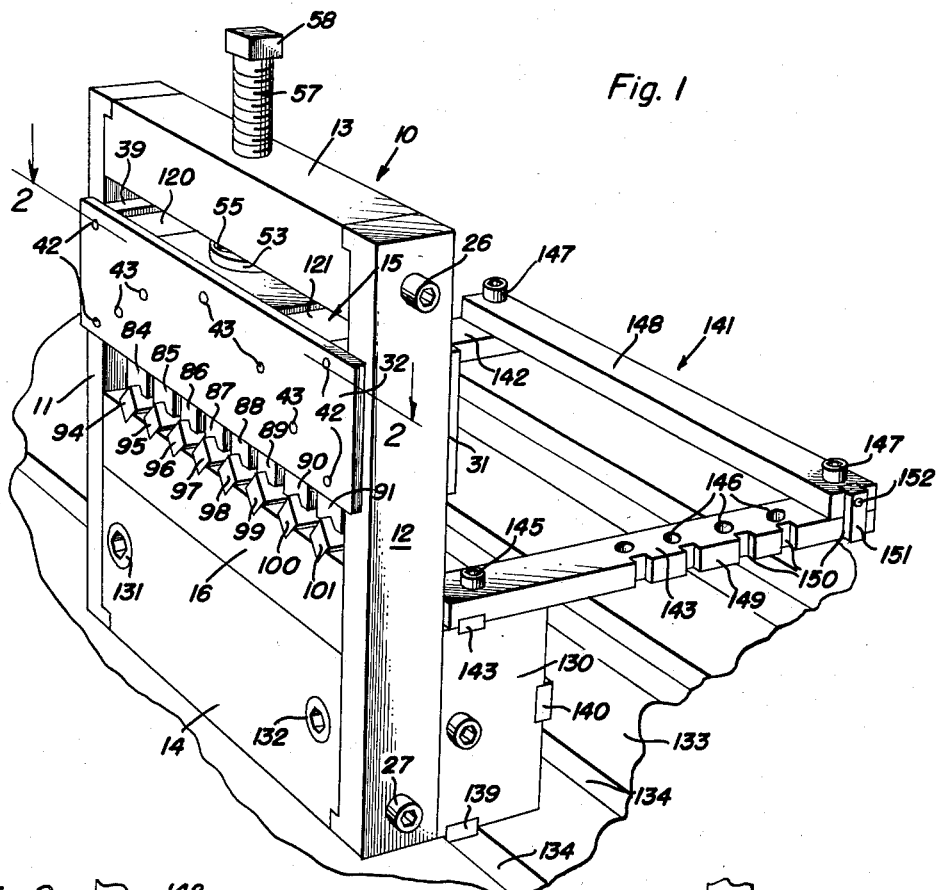
FIGURE 1 is a perspective view of a work holding fixture constructed in accordance with this invention and showing the same operatively holding a plurality of workpieces in position for a machining operation.

Referring at this time more particularly to FIGURES 1–4 inclusive, the reference character 10 indicates in general the frame for the holding fixture and which frame will be seen to consist essentially of a pair of spaced, parallel side rail members 11 and 12 rigidly joined together at one end thereof by the back bar element 13 and at the other end thereof by the head element 14.

Carried between the side rails 11 and 12 is a compensating jaw assembly indicated generally by the reference character 15 and which is cooperable with a fixed jaw member 16 disposed between the side rails 11 and 12 and backed up by the head portion 14.

As can be seen most clearly in FIGURES 1 and 3, there is preferably provided some means between the side rails 11 and 12 as well as the back bar 13 as well as the head piece 14 to interengage or lock the same together so as to resist separation of the elements 13 and 14. From these figures, it will be evident that for achieving the purpose, the particular embodiment shown utilizes laterally inwardly directed ears 17, 18, 19 and 20 at the opposite ends of the side rails 11 and 12 which are received within and lockingly interengaged within the stepped portions 21, 22, 23 and 24 in the back bar 13 and head piece 14 respectively.

By reason of the interlocking engagement between the ears 17—20 and the notches 20—24, the back bar 13 and the head piece 14 are firmly anchored in place so as to resist movement of these parts away from each other. In order to securely fasten the side rails 11 and 12 to the back bar and head piece, bolt elements such as those indicated by the reference characters 25, 26, 27 and 28 are utilized. It is to be appreciated that the elements 11 and 12 together with the elements 13 and 14 form a rigid, open framework for the fixture obviating, as can be best seen in FIGURE 1, the accumulation of chips, foreign material or the like within the confines of the fixture during use. Ordinarily, in work holding fixtures in general, the problem of accumulation of chips and the like is formidable, but in the present construction, such problem is substantially completely eliminated.

The fixed jaw member 16, as can be best seen in FIGURE 3, is of a length such that the opposite end portions thereof bear against the inner side surfaces 29 and 30 of the side rails 11 and 12 respectively. If desired, suitable means may be employed to anchor the fixed jaw member 16 to the side rails but this is not absolutely essential as the fixture may be merely slid into place since, when in use, it will be firmly anchored to the head piece 14.

Figure 2:
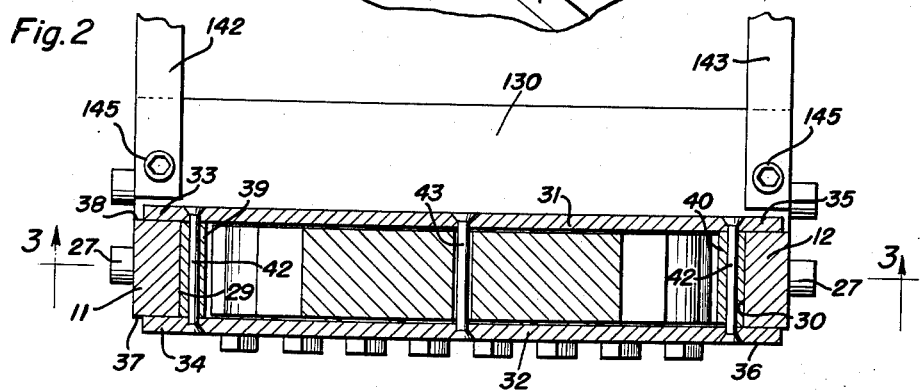
FIGURE 2 is an enlarged horizontal section taken substantially along the plane of section line 2—2 in FIGURE 1 and showing details of construction of the compensating jaw assembly and its operative association with the side rails of the framework of the fixture.

The compensating jaw assembly 15, as can be best seen in FIGURES 2 and 3, consist essentially of a pair of spaced, parallel retainer plates 31 and 32 having the opposite end portions 33, 34 and 35, 36 slidably sandwiching the side rails 11 and 12 therebetween. That is to say, these opposite end portions of the retainer plates snugly but slidably contact the opposite edge surfaces 37 and 38 of the side rails so that at all times, the retainer plates are free for sliding movement along the rails. In order to maintain the proper distance between the retainer plates 31 and 32, spacer plates 39 and 40 are utilized, which spacer plates preferably snugly bear against the inner surfaces 29 and 30 of the side rails 11 and 12 to properly laterally position the retainer plates and guide the same for movement along the side rails.

The spacer plates 39 and 40 are rigidly affixed to the retainer plates so that the retainer plates together with the spacer plates form a rigid and integral assembly by means of suitable rivets or other fasteners 42 as is shown most clearly in FIGURE 2. A plurality of similar pins, rivets or the like 43 extend between the retainer plates 31 and 32 and each of these additional pins or rivets is associated with a separate compensating jaw element as is seen most clearly in FIGURE 3.

The compensating jaw elements themselves are arranged in stages, each stage including one or more compensating jaw elements with the number of jaw elements in each stage being progressively greater until the final stage is reached. For example, as is shown most clearly in FIGURE 3, the first stage is composed of the master jaw element 50 which in this particular construction is in the form of an elongate generally rectangular block having a more or less centrally disposed opening 51 therethrough receiving a corresponding pin or rivet 43. On the outer face 52 of this jaw element is a block 53 provided with a bore 54 opening upon the counterbore which is engaged against the face 52 of the jaw element 50 and is rigidly affixed thereto as by a suitable fastener 56. The purpose of this block 53 is to fasten the master jaw 50 and consequently the compensating jaw assembly 15 to the lock screw 57 which is threaded through a tapped opening extending through the back bar 13 and which is provided at its outer free end, see particularly FIGURE 1, with a suitable head 58 or the like by means of which the screw may be selectively turned to advance the compensating jaw assembly toward and away from the fixed jaw element 16.

The next stage in the compensating jaw element assemblage is comprised of the two compensating jaw elements 60 and 61 each of which is provided with a substantially centrally disposed opening such as those indicated by the reference characters 62 and 63 receiving corresponding rivets or pins 43 as previously described. In the construction illustrated in FIGURE 3, the rear faces 64 and 65 of the jaw elements 60 and 61 respectively are arcuated as shown and substantially medially thereof these faces are contacted by the forward face 67 of the master jaw element 50. The next stage is composed of four compensating jaw elements 68, 69, 70 and 71 having arcuated rear surfaces as indicated by the reference characters 72, 73, 74 and 75 substantially medially engaged by the flat forward faces 76 and 77 of the jaw elements 60 and 61 respectively. The forward faces of the jaw elements 68–71 inclusive are flat as is indicated by the reference characters 80, 81, 82 and 83 for cooperation with the final stage composed of the several compensating jaw elements 84, 85, 86, 87, 88, 89, 90 and 91. The forward faces of the final stage compensating jaws are notched or otherwise suitably formed as indicated by the reference character 92 in FIGURE 3 to cooperate with the formation provided on the opposed face 93 of the fixed jaw element 16. In this manner, the plurality of work pieces as is indicated by the reference characters 94, 95, 96, 98, 99, 100 and 101 are rigidly and firmly clamped between the final stage compensating jaws and the fixed jaw 16, substantially as shown.

From the above, it will be readily apparent that the several stages from the initial stage to the next to the last stage compensating jaws are operatively held in position between the retaining plates 31 and 32 by means of the several pins or rivets 43 and the enlarged openings or bores extending through the individual compensating jaws. It is to be noted, however, that the pins 43 are of substantially smaller diameter than the respective openings in the compensating jaw elements so as to permit relative movement between the compensating jaws and the pins in any direction within a plane parallel to the retainer plates 31 and 32. This is to accommodate for variations in size and slight variations in shape of the several workpieces 94–101 inclusive and to permit shifting laterally in any direction of the individual compensating jaws with respect to each other so as to accommodate for the variations within the workpieces and yet at the same time permit pivoting of the compensating jaws so as to exert a uniform and equal force upon all of the workpieces so that all workpieces are held firmly and fixedly in place as occasioned by the lock screw 57. The final stage compensating jaws may be provided with pin and bore connection to the retainer plates 31 and 32 but in the specific form shown, this is not necessary since a dust sealing assembly is utilized for this purpose. For example, as is shown most clearly in FIGURE 3, the spacer plates 39 and 40 and the adjacent jaw elements 84 and 91 are provided with opposed slots or notches as indicated by the references 110 and 111 on the one hand and 112 and 113 on the other hand and opposite side edges of the dust guard plates 114 and 115 are received therein, as shown, with the width of such sealing or dust guard plates being such as to normally leave a slight spacing between the opposite edges of these plates and the elements 39, 84 and 40, 91, respectively. This permits of lateral movement of the final stage compensating jaws to accommodate for variations in thickness and size of the several workpieces. Similar dust guard or sealing plates 116, 117, 118, 119, 120, 121 and 122 are disposed between adjacent ones of the final stage compensating jaws 84—91, substantially as is shown in FIGURE 3 and the plates thus disposed are similarly provided with spacing to permit the lateral shifting of all of the jaw elements.

The fit between the sealing plates and the jaws as well as the spacer plates 39 and 40 is such as to prevent the final stage compensating jaws from dropping or falling out of place and yet substantially the same degree of freedom as is imparted to the intermediate and first stages of the compensating jaws are attained by the use of these sealing plates. As previously discussed, the final stage compensating jaws could also be located with respect to the retainer plates by means of pins or rivets 43 with or without the use of the sealing or dust guard plates.

To complete the internal sealing of the assembly, sealing plates 120 and 121 are provided between the opposite ends of the master jaw element 50 and the opposed faces of the spacing plates 39 and 40, thus effectively preventing the entrance of chips, dust or any foreign material into the interior of the compensating jaw assembly 15 and serving at all times to maintain the same in an unclogged condition so that the various compensating jaws may be freely moved in accordance with the demands of the workpieces upon which they are operating.

It will be noted that the compensating jaws are so related with respect to each other that progressing from the initial to the final stages of the compensating jaws, each jaw in one stage bears upon and operatively contacts two jaws in the next stage and it is preferred that the contacting surfaces between such cooperative groups of jaws be such as to obtain a tangential relationship therebetween to permit independent motion of the several jaws with respect to each other so that each may seek its own position with respect to all of the others such that the clamping forces finally exerted upon the workpieces is identical in each case. It is also to be noted that the compensating jaw assemblage 15 does not in any way depend upon the pins 43 to transfer or transmit any of the clamping force to the workpieces but these pins, wherever used, are only for the purpose of initially holding the compensating jaw elements in place and for securing the retaining plates 31 and 32 rigidly together. Since the retaining plates are free at all times to move relative to the side rails 11 and 12, should any one or a number of the compensating jaws bear against the pins 43, the retainer plates will be moved thereby to seek a new position and no strain will be imposed upon the individual pins or rivets 43. In this respect, this result is achieved by making the openings or bores through the individual compensating jaws sufficiently larger than the diameters of the pins or rivets as to permit this action within all reasonable limits that may be encountered during actual practice. At the same time, the compensating jaw assemblage 15 does not require extremely accurately machined compensating jaw surfaces nor is there any interlocking engagement between the several compensating jaws which would necessitate such accurate machining as to render the cost of producing the compensating jaws prohibitive. Still further, it is to be appreciated that an entire compensating jaw assembly may be easily and quickly replaced by another and different compensating jaw assembly by simply removing one of the side rails 11 or 12 from the assembly, removing the fastener 56 from the shoe or block 53 retaining the lock screw 57 to the master jaw element 50 and then sliding the compensating jaw assembly away from the rest of the unit to permit the insertion of a different compensating jaw assembly. At the same time, it will be readily appreciated that by narrowing the width of the retainer plates 31 and 32, and using substantially the same or identical compensating jaw elements, the final stage of compensating jaw elements may be replaced by the next preceding stage. For example, in FIGURE 3, a further compensating jaw assembly 15 may be made by slightly narrowing the retainer plates 31 and 32, eliminating the last stage of the compensating jaws, jaws 84–91 inclusive, and making the width of the retainer plates such as to expose the outer end or forward faces 80–83 inclusive of the second to last stage jaws, 68–71 so that these latter jaws in themselves form the final stage for bearing against the workpiece. In this manner, two jaw assemblies may be made up which embodies substantially the same compensating jaw elements individually therein with the exception of the omission of the final stage illustrated in FIGURE 3. This further renders the cost of production of such devices as economical as possible.

As is shown most clearly in FIGURE 1, as well as in FIGURE 4, the fixture is provided with an anchor block 130 which is rigidly affixed, by means of the cap screws 131 and 132 to the head piece 14 and at one side of the fixture, as shown. The purpose of this anchor block is to facilitate mounting of the fixture to the bed or table 133 of an associated machine such as a milling machine or the like. The table 133 is conventionally provided with a plurality of T-slots 134 with which the anchor block 130 may cooperate. For this purpose, the undersurface 135 of the anchor block as well as the outside surface 136 thereof may be provided with keyways 137 and 138 respectively receiving the keys 139 and 140 which guidably position the anchor block with respect to the T-slots 134. Suitable fasteners or bolts, not shown, may be then utilized to anchor the block 136 to the bed or table 133.

From the positioning of the keys 139 and 140, it will be obvious that the fixture may be used in the upright position as is shown in FIGURE 1 or in a horizontal position wherein the surface 136 of the anchor block 130 serves as the supporting surface therefor. When in the position shown in FIGURE 1, if the workpieces 94–101 inclusive are of sufficient length, the rest or gauge assembly indicated generally by the reference character 141 may be utilized. The assembly 141 consists essentially of a pair of spaced, parallel gauge bars 142 and 143 secured at one end to the upper surface 144 of the anchor block 130 and suitably keyed thereto as by the keys 143 with the cap screws 145 holding the gauge bars in place. The opposite end of each of the gauge bars is provided with a plurality of longitudinally spaced tapped apertures 146 for selectively receiving the anchoring members 147 therein which hold the gauge bar 148 in place selectively along the length of the gauge bars 142 and 143.

In cooperation with each of the tapped holes 146 and in the outer sides 149 of the gauge bars 142 and 143 are a series of vertical notches 150 cooperable with a key 151 secured, as by fasteners 152 to the opposite ends of the gauge bars 148 and serving to adjustably locate the gauge bar with respect to the gauge bars 142 and 143, longitudinally therealong. The gauge 148 is utilized to support the ends of workpieces having sufficient length to necessitate such additional support.

FIGURE 5 illustrates a slightly modified form of compensating jaw mechanism and in which case the various jaws as indicated by the refeernce characters 160, 161 and 162 are all located between the associated retainer plates, one of which is shown as at 163 by means of rivets or pins 164, these rivets or pins extending through enlarged openings 165 in the several compensating jaws. Sealing elements 166 may be provided between adjacent jaws of the final stage and the semi-annular configuration of the last stage jaws 162, as is illustrated by the full and dotted line illustrations in FIGURE 5, can accommodate for relatively large workpieces such as those indicated by the reference character 167 or extremely small workpieces as is shown in the reference character 168. That is to say, the opposite end portions 169 of the individual final stage compensating jaws are receivable within the notches 170 of the fixed jaw element 171. The modification shown in FIGURE 5 serves further to illustrate the desirability of providing a tangential contact between the cooperating compensating jaws, in each case as illustrated in FIGURE 5, the compensating jaws having one semi-circular surface and an opposing cooperative flat surface.

Figure 6:
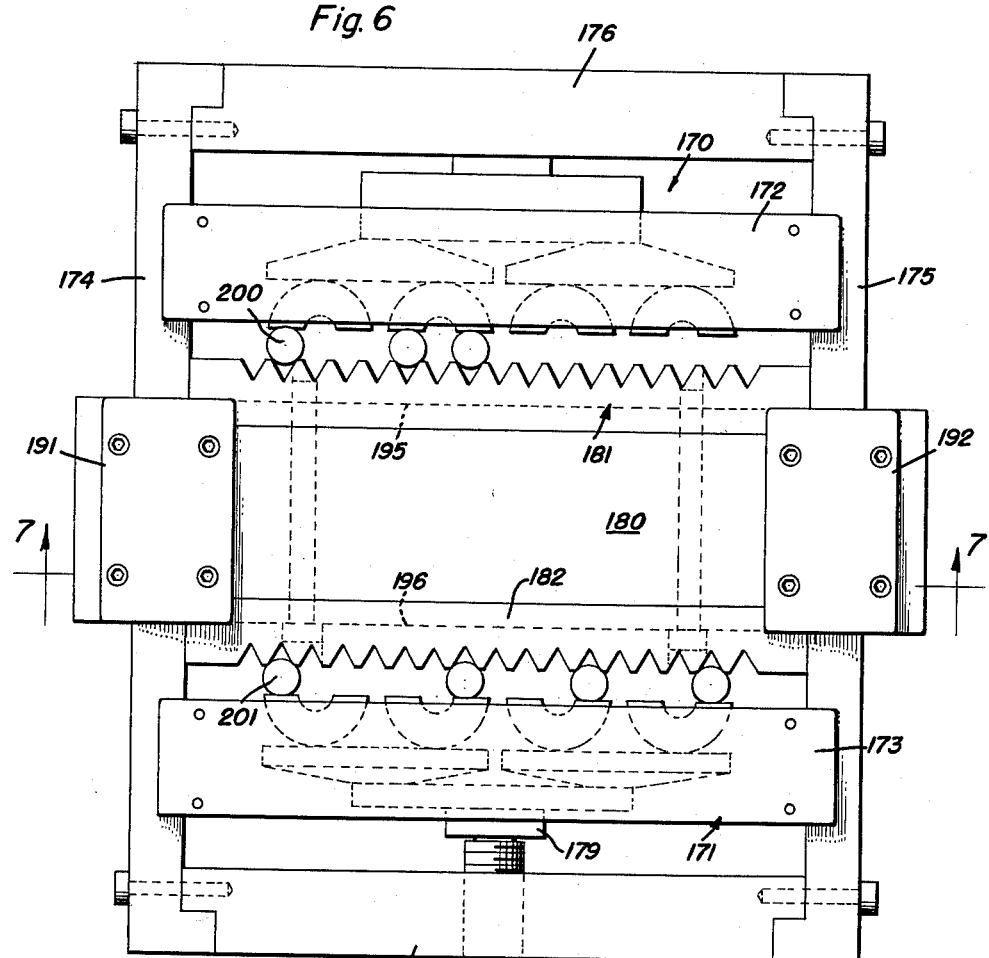
FIGURE 6 is a plan view of a still further modified form of the device in which two series of workpieces are simultaneously held.

The fixture illustrated in FIGURE 6 employs essentially the same principles of operation as does the construction illustrated in FIGURES 1-4 inclusive. However, in FIGURE 6, two compensating jaw assemblies 170 and 171 are utilized, each being constructed similarly to those illustrated in FIGURES 1-4 or as in FIGURE 5 or in any suitable manner utilizing the novel principles thereof.

In each case, the retainer plates 172 and 173 of the assemblies 170 and 171 overlap and sandwich, slidably, the side rails 174 and 175 of the frame assembly for the fixture, the opposite ends of the side rails being joined by the back bar assemblies 176 and 177, one of which carries the lock screw 178 engageable with a block or shield 179 carried by the compensating jaw assembly 171.

Figure 7:
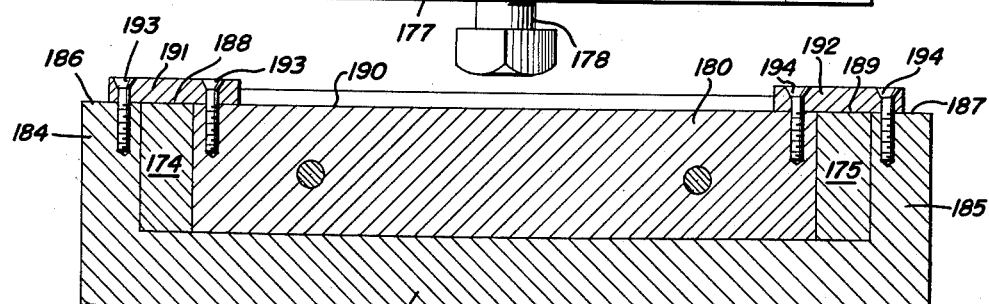
FIGURE 7 is a transverse sectional view taken substantially along the plane of section line 7—7 in FIGURE 6 illustrating details of the fixed jaw assembly.

The head piece 180 is disposed intermediate the two back bars 176 and 177 and is movable therebetween. This is illustrated most clearly in FIGURE 7 wherein it will be noticed that the headpiece 180 which cooperates with the two removable jaw members 181 and 182, the fixed jaw members in this case, is held in place by virtually of a generally U-shaped body member 183 having the uprights or legs 184 and 185 disposed on opposite sides of the side rails 174 and 175 respectively and having their upper faces 186 and 187 terminating in coplanar relationship with the upper surfaces 188 and 189 of the side rails 174 and 175 as well as coplanar with the upper surfaces 190 of the head piece 180. Securing strap or plate elements 191 and 192 are secured, as by fasteners 193 and 194 to the legs 184 and 185 as well as to the opposite end portions of the head piece 180. Thus, they firmly anchor the same to the side rails 174 and 175, albeit removably so. It is to be noted that the intermediate portion as well as the legs 184 and 185 of the U-shaped body 183 is wider than the head piece 180, the opposite sides thereof being illustrated in FIGURE 6 by the dotted lines 195 and 196 and that the opposite ends of the anchoring straps or plates 191 and 192 overlie the fixed jaw elements 181 and 182 serving to hold the same in place until the plates 191 and 192 are removed, after which the fixed jaw members may be easily removed.

Each compensating jaw assembly 170 and 171 is cooperable with a respective fixed jaw element 181 or 182 and is adapted to receive and hold a plurality of workpieces such as those illustrated by the reference characters 200 and 201 therebetween so that twice the number of workpieces may be held in a construction of this nature.

In every case, it is to be noted that the compensating jaw assembly is complete in and of itself and may be removed from the remainder or the frame of the fixture and may be replaced, as desired, with either an identical unit or with a different type of compensating jaw assembly, as is required for the particular workpieces being machined. Likewise, the fixed jaw elements are equally as readily removable and replaceable so as to accommodate for different types of workpieces.

The open construction of the framework and the particular arrangement of compensating jaw and fixed jaw assemblies permits work pieces of any length to be accommodated for when the fixture is used in the upright position as is illustrated in FIGURE 1, and the gauge bar assemblage can be accommodated to support the workpieces as desired to assure substantially the correct positioning thereof during the machining operations. The open construction further obviates the collecting of chips within the assembly and in and around the workpiece area which might otherwise interfere with the normal machining operations. Thus, the units are easily cleaned and the machining operations may continue uninterruptedly without necessitating frequent chip removal and the like.

Most important, perhaps, is the economical construction of the units as above described since they utilize many parts which can be used in different sizes and types of work holding fixtures and since there is no necessity in any instance for extremely accurate machining operations which are costly and time consuming.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A work holding fixture comprising a frame including a fixed jaw member mounted thereon, a compensating jaw assembly slidably mounted on said frame for movement toward and away from the fixed jaw member, said compensating jaw assembly including a pair of retainer plates, a plurality of individual compensating jaws carried between said retainer plates, said compensating jaws being arranged in transverse stages with the first stage being remote from said fixed jaw member and comprising a single, transversely elongate jaw element and with the final stage being nearest said fixed jaw member and comprising a plurality of side-by-side, spaced jaw elements having end portions projecting beyond said retainer plates towards said fixed jaw member, a lock screw carried by said frame and engaging said first stage jaw element, and each compensating jaw being freely movable in a plane parallel to said retainer plates with adjacent stages of jaws being engaged by the first preceding stage for transmitting compressive clamping force only whereby clamping of a plurality of individual workpieces held between the fixed jaw member and said compensating jaw elements of the final stage will be uniform, said final stage jaw elements being laterally movably mounted between the retainer plates for permitting variation in the spacing of the final stage jaw elements for gripping a plurality of workpieces having different center to center spacing.

2. A device for securely gripping a plurality of workpieces comprising a rigid frame having a stationary jaw fixed thereto, a movable jaw assembly slidably carried by said frame, means interconnecting said frame and movable jaw assembly for effecting movement of the movable jaw assembly toward and away from said stationary jaw, said movable jaw assembly including a plurality of transversely arranged rows of jaw elements with the final row adapted to engage a plurality of workpieces, a single transverse jaw element connected with said means, a pair of retainer plates retaining the jaw elements in position with the jaw elements being slidable between said plates, the final row of jaw elements projecting beyond said retainer plates, and means connecting the final row of jaw elements to said frame and to each other for permitting side shift of said jaw elements for accurate alignment with each of a series of workpieces having various center to center relationships thereby applying equal clamping pressure to each such workpiece.

3. The combination of claim 2 wherein the jaw elements of each row are provided with arcuate inner surfaces and substantially flat outer surfaces engaging the arcuate surfaces of the next adjacent row of jaw elements for applying compressive force by surface to surface contact.

4. A device for securely gripping a plurality of workpieces comprising a rigid frame having a stationary jaw fixed thereto, a movable jaw assembly carried by said frame, means interconnecting said frame and movable jaw assembly for effecting movement of the movable jaw assembly toward and away from said stationary jaw, said movable jaw assembly including a plurality of transversely arranged rows of jaw elements with the final row adapted to engage a plurality of workpieces, a single transverse jaw element connected with said movement effecting means, a pair of parallel retainer plates retaining the jaw elements in position with the jaw elements being slidable between said plates, the final row of jaw elements projecting beyond said retainer plates, and means connecting the final row of jaw elements to said frame and to each other for permitting side shift of said jaw elements for accurate alignment with each of a series of work pieces having various center to center relationships thereby applying equal clamping pressure to each such workpiece, the jaw elements of each row having arcuate inner surfaces and substantially flat outer surfaces engaging the arcuate surfaces of the next adjacent row of jaw elements thereby transmitting only compressive force by surface to surface contact, said jaw elements of each row bridging two jaw elements of the next adjacent row disposed towards the final row of jaw elements.

References Cited in the file of this patent

UNITED STATES PATENTS

| | | |
|---|---|---|
| 175,863 | Kramar | Apr. 11, 1876 |
| 419,073 | Richards | Jan. 7, 1890 |
| 838,143 | Seymour | Dec. 11, 1906 |
| 1,059,545 | Kunze | Apr. 22, 1913 |
| 1,256,217 | Fieldhouse | Feb. 12, 1918 |
| 2,346,053 | Smith | Apr. 4, 1944 |
| 2,560,382 | Barr | July 10, 1951 |
| 2,600,787 | Lodwick | June 17, 1952 |

FOREIGN PATENTS

| | | |
|---|---|---|
| 471,674 | France | Nov. 6, 1914 |

OTHER REFERENCES

Publication—War Production Board, circular M–56, sheet 3, December 10, 1944, prepared by the A.S.M.E., 29 W. 39th Street, New York 18, N.Y. Manufacturing Engineering Committee.